United States Patent [19]
Francis

[11] Patent Number: 5,259,030
[45] Date of Patent: Nov. 2, 1993

[54] ANTIJAM IMPROVEMENT METHOD AND APPARATUS

[75] Inventor: James C. Francis, Rochester, N.Y.

[73] Assignee: Harris Corporation, Melbourne, Fla.

[21] Appl. No.: 731,339

[22] Filed: Jul. 17, 1991

[51] Int. Cl.$^5$ .......................... H04K 1/02; H04K 1/04
[52] U.S. Cl. .......................................... 380/6; 342/16;
342/19; 375/1; 380/8
[58] Field of Search .......................... 375/1; 380/6, 8;
342/16, 19

[56] References Cited

U.S. PATENT DOCUMENTS

| | | | |
|---|---|---|---|
| 4,606,041 | 8/1986 | Kadin | 375/1 |
| 4,608,701 | 8/1986 | Burgers et al. | 375/1 |
| 4,761,796 | 8/1988 | Dunn et al. | 375/1 |
| 4,914,699 | 4/1990 | Dunn et al. | 380/34 |
| 5,016,256 | 5/1991 | Stewart | 375/1 |

*Primary Examiner*—Stephen C. Buczinski
*Attorney, Agent, or Firm*—Rogers & Killeen

[57] ABSTRACT

A method and apparatus for communicating radio frequency signals that may reduce the susceptibility of the signals to jamming. A digital voice signal may be interleaved and transmitted with error correction signals related to the voice signal. The transmission may use frequency hopping with each hop including appropriate synchronization signals, data signals and error correction signals. The received signal at the receiver portion of the signal may contain means for removing both nonexcisable and excisable interference. The nonexcisable interference may be identified and removed by (1) assuming different jamming patterns, (2) decoding to resolve the received signals for each of the assumed jamming patterns, and (3) voting all of the resolved signals to determine which assumed jamming pattern produces the best results. An adaptive filter for removing excisable jamming may applied when such jamming is detected.

8 Claims, 5 Drawing Sheets

ANTIJAM IMPROVEMENT METHOD AND APPARATUS

BACKGROUND OF THE INVENTION

The present invention relates to a method and apparatus communicating radio frequency signals, particularly digitally encoded voice signals, with a reduced susceptibility to successful jamming. More particularly, the invention relates to a method and apparatus for overcoming jamming of voice radio communications by non-ferers and by excisable interferers.

The need for reliable radio communications systems has increased in recent years, especially for military applications. As the need for reliable radio communications has increased, the sophistication and complexity of systems designed to reduce that reliability, such as jamming, have also increased. In response to the development of sophisticated jamming systems various antijamming methods and devices have been developed to restore the reliability of the radio communications.

Jamming techniques may be characterized as excisable or non-excisable. Jamming which is excisable is a relatively narrowband with respect to the desired signal. Typically, a filter may be continuously applied to excise or remove the jamming, even when such jamming is not present.

Jamming which is not excisable with a narrowband filter is termed nonexcisable. Nonexcisable jamming may come in short bursts of varying lengths on frequencies that may also vary. Nonexcisable jamming may also be masked or removed but first must be identified.

Identification of nonexcisable jamming is particularly difficult because it may be random in time and frequency or it may be spectrally similar to the desired signal. The problem of dealing with nonexcisable jamming is further complicated by the unpredictability of such jamming. Even if a particular nonexcisable jamming technique is identified the identification may not be useful to predict future jamming and must be continuously updated.

While various techniques for dealing with excisable jamming have been developed none are able to detect such jamming and apply appropriate filters only when the jamming has been detected, and none provide the vigorous and continuous identification of jamming necessary to deal with nonexcisable jamming. For example, various frequency hopping and spread spectrum techniques are described in U.S. Pat. Nos. 4,914,699 and 4,761,796 to Dunn, et al., U.S. Pat. No. 4,653,068 to Kadin and U.S. Pat. No. 4,843,612 to Brusch, et al.

In the present invention, a radio communication signal, preferably one that is a digital voice signal, is interleaved and transmitted with error correction signals related to the voice signal. The transmission may use frequency hopping and may be divided into blocks of data, called hops herein, with synchronization signals between hops. The signal received at the receiver portion of the system may contain excisable and/or nonexcisable jamming. The excisable jamming may be removed with an adaptive filter that may be applied only when the jamming is present. The nonexcisable interference may be identified and dealt with by (1) assuming different particular jamming patterns, (2) decoding to resolve the received signal for each of the assumed jamming patterns, and (3) voting all the resolved signals to determine which assumed jamming pattern produces the best results. The received signal may be demodulated using the jamming pattern which produces the best results.

Accordingly, it is an object of the present invention to provide a novel method and apparatus with an improved antijamming technique for radio communications.

It is a further object of the present invention to provide a novel method and apparatus for identifying nonexcisable jamming in a digitized voice signal.

It is yet a further object of the present invention to provide a novel method and apparatus for identifying and overcoming nonexcisable jamming on a real time basis.

It is still a further object of the present invention to provide a novel method and apparatus for determining when excisable jamming is present and applying a filter responsively.

It is another object of the present invention to provide a novel method and apparatus for proposing alternative jamming patterns and voting to determine which of the jamming patterns produces the best results without perceptively delaying reception of the signal.

These and many other objects and advantages will be readily apparent to one skilled in the art to which the invention pertains from a perusal of the claims, the appended drawings, and the following detailed description of preferred embodiments.

THE DRAWINGS

DESCRIPTION OF PREFERRED EMBODIMENTS

Figure 1:
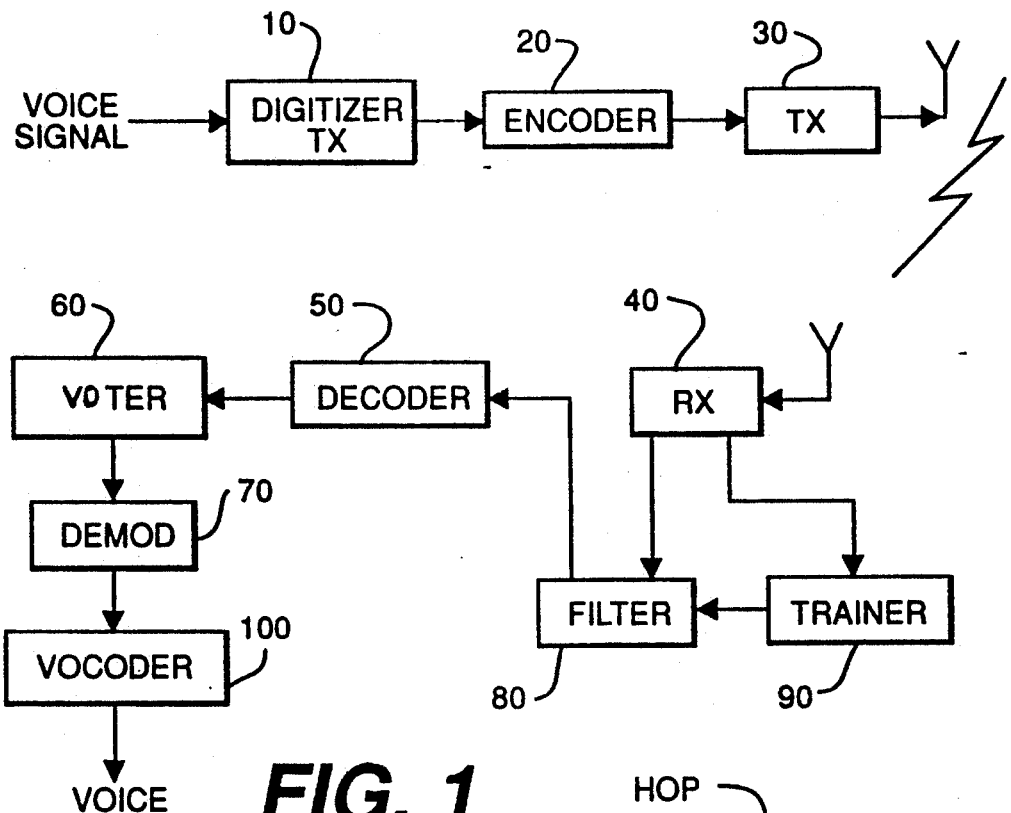
FIG. 1 is a block diagram of an embodiment of the present invention depicting the flow of signals therein.

With reference now to FIG. 1, a preferred embodiment of the present invention may include a digitizer 10 for transforming voice signals to a digital signal, an encoder 20 for adding error correction signals to the digitized voice signal, and a transmitter 30 for transmitting the encoded digital signal. The transmitted signal may also include framing and synchronizing signals, as is well-known in the art. The transmitted signal may be received by a receiving unit that includes receiver 40 and a decoder 50 for assuming particular jamming patterns and using the error correction signals to resolve the received signal for each of the assumed jamming patterns, a voter 60 for determining which of the resolved signals produces the best result, and a demodulator 70 for demodulating the received signal assuming the jamming pattern which produced the best results.

The present invention may also include an adaptive filter 80 for masking excisable jamming. A trainer 90 may be included which operates with the adaptive filter 80 to recognize the particular frequency to be filtered. A vocoder 100 may also be included to produce an appropriate voice signal from the demodulated signal.

Figure 2:
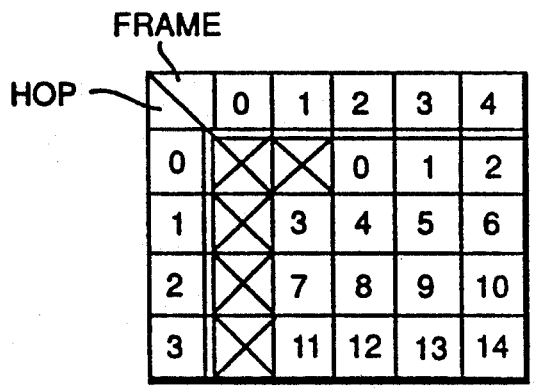
FIG. 2 is a tabular depiction of the arrangement of digital data in the present invention.

In a preferred embodiment of the present invention, voice signals which have been digitized may be partitioned as seen in FIG. 2. Each block of data of a predetermined size may be partitioned into four hops (labeled 0, 1, 2, 3 in FIG. 2). Each such block of four hops is termed a resync interval. As will be seen, the receiver may be resynchronized at any resync interval boundary. Each hop may be divided into five frames (labeled Frame 0, 1, 2, 3, 4 in FIG. 2) so that each resync interval comprises twenty frames. Fifteen of the twenty frames in a resync interval may be available for transmission of digital data (labeled frames 0–14 in FIG. 2). The remaining five frames may be allocated to signal acquisition or to establish a phase reference. Each frame may include 32 bits and, thus, the first hop consisting of Frames 0, 1 and 2 may include 96 bits. Each of the three remaining hops may include 128 bits for a total of 480 data bits in a resync interval.

The transmission rate of data in a resync interval may exceed the rate at which the voice signal is digitized so that the resync interval may have room to include the error correction signals. The amount of room required (and therefore the difference between the rates) may be determined by factors such as the amount of encoding deemed necessary, the reliability of the transmission system at various transmission rates and the quality of voice signal required. For example, room for the error correction coding of the present invention may be found in a system in which a reliable transmission rate may be 2400 bits per second and an acceptable voice digitization rate may be about 800 bits per second. In this example, the throughput rate is one-third (800/2400). In the preferred embodiment of the present invention a throughput rate of one-third provides that 160 of the 480 data bits in a resync interval may be digitized voice signal and 320 bits may be error correction coding.

The jamming pattern within a resync interval may be determined by using the error control coding. For example, the error control coding may include a nested code. An inner code may provide error detection using a parity check in which a check bit may be added after a predetermined number or bits of information. The outer code of the nested code may provide error control coding using a Reed-Solomon technique. The Reed-Solomon technique redundantly represents the digital signal to ensure that each signal segment will be received in many different almost any jamming patterns. The amount of redundancy may be predetermined based upon the throughput rate. For this example, the 160 bits of digitized voice signals in each resync interval may be divided into eight words of twenty bits each. A parity check bit may be added after five bits of information and a Reed-Solomon (15,6) over GF (16) may be used to yield the 480 data bits for the resync interval.

Figure 3:
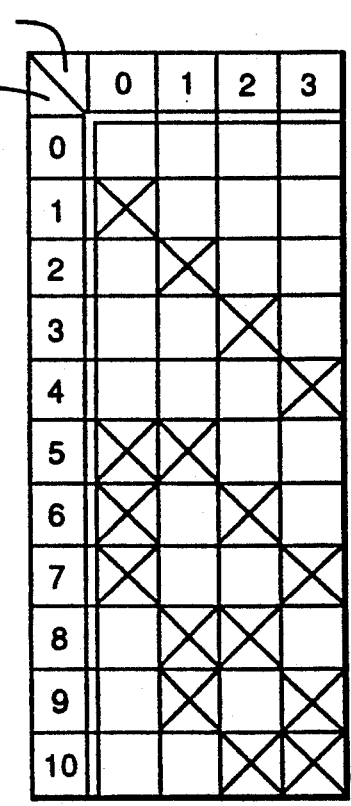
FIG. 3 is a tabular depiction of the various jamming patterns used to identify nonexcisable jamming in an embodiment of the present invention.

At the receiver, the jamming pattern for a particular resync interval may be identified by alternately hypothesizing various predetermined jamming patterns. With reference now to FIG. 3, eleven different patterns (designated 0–10) that may be used with a preferred embodiment of the present invention represent each possible pattern in which up to two of the four hops in each resync interval may be jammed. For example, pattern 0 includes no jamming, pattern 4 includes jamming of the fourth hop, and pattern 8 includes jamming in the second and third hops. For each of the assumed jamming patterns, the error control coding described above (the parity checks and the Reed-Solomon techniques) may be decoded to attempt to resolve the received signal for each assumed jamming pattern. The results for each of the assumed jamming patterns may be analyzed by voting to determine which of the jamming patterns produce the best results. The selected jamming pattern may be then used in the demodulator to reconstruct the received signal so that the received signal may be communicated to the recipient of the message in a display or through a speaker.

Figure 4:
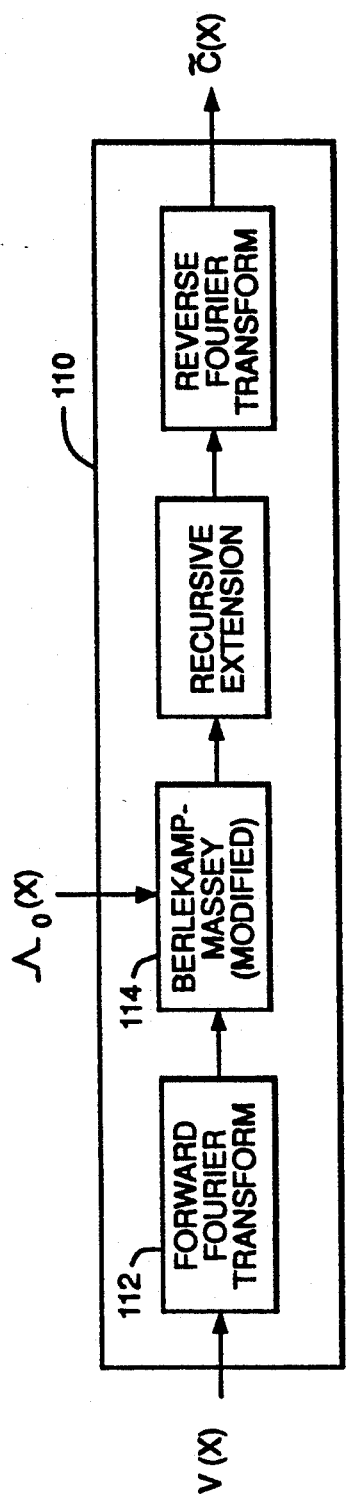
FIG. 4 is a block diagram of an errors and erasures decoder for a Reed-Solomon code of the present invention.
Figure 5:
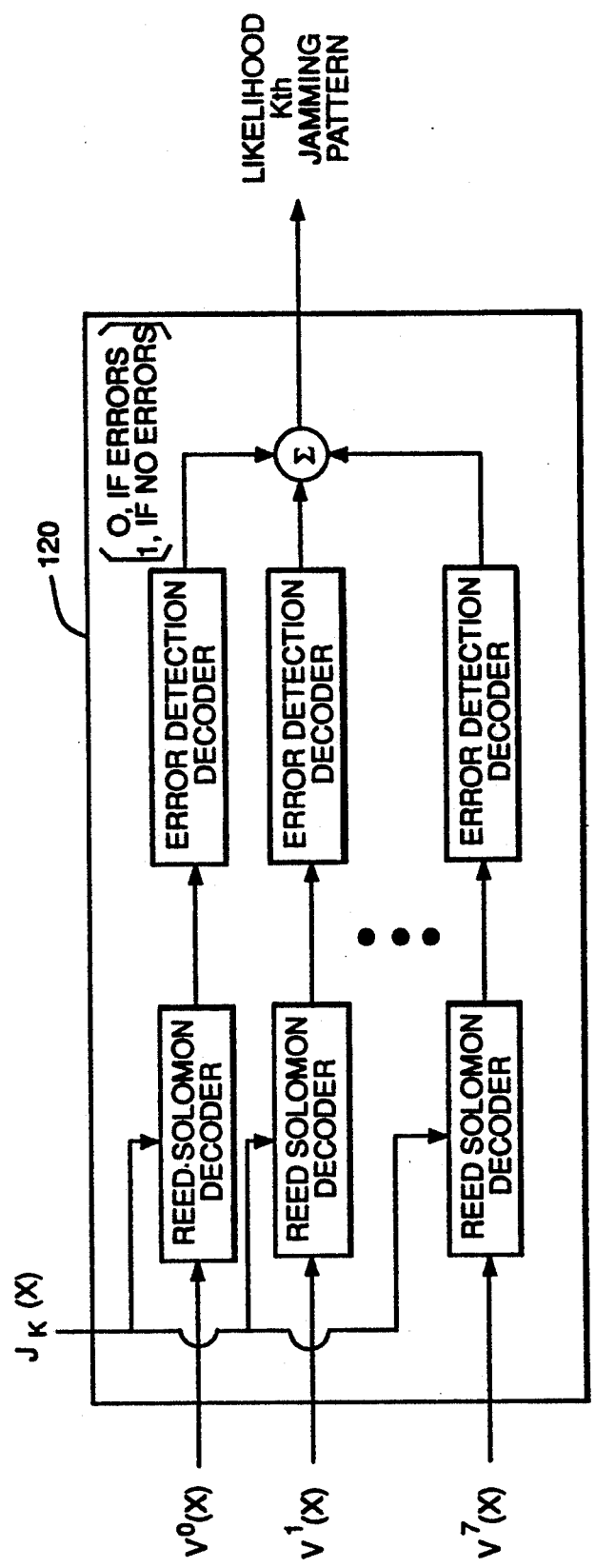
FIG. 5 is a block diagram of a decoder for determining a correlator for a hypothesized jamming pattern in the present invention.
Figure 6:
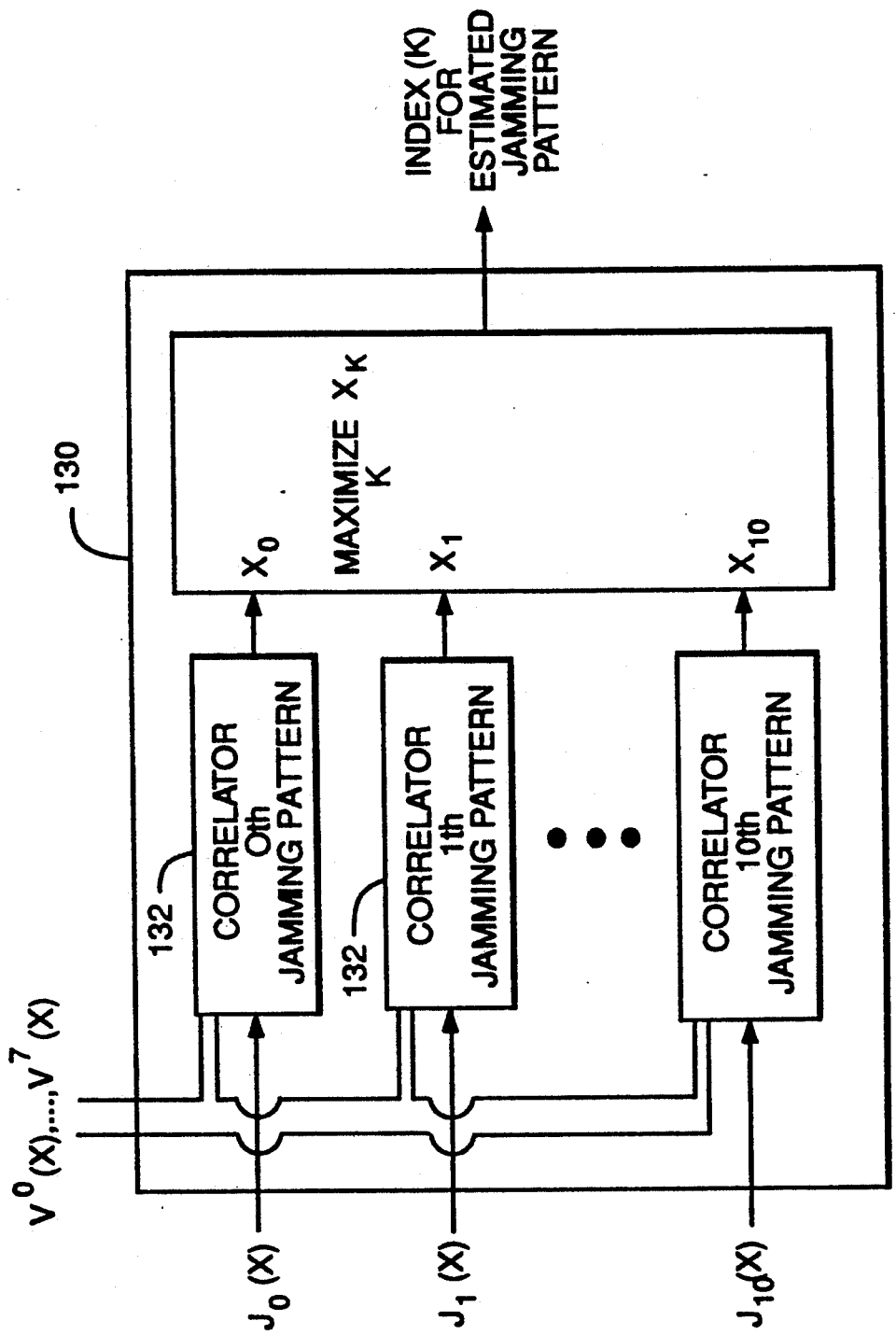
FIG. 6 is a block diagram of the method for selecting the jamming pattern that is to be used for demodulation.

With reference now to FIGS. 4, 5 and 6, the decoding of the received signal may be more clearly seen. The Reed-Solomon decoder 110 may be seen in part with reference to FIG. 4. The received signal $v(x)$ may be transformed with a Fourier transform 112 and provided to a device 114 for performing a Berlekamp-Massey algorithm. Each of the proposed jamming patterns may be input to the Berlekamp-Massey algorithm device 114 in the form of an erasure locator polynomial (lambda in FIG. 4). A correlator for each of the proposed jamming hypotheses may be developed in the decoder 120 seen in FIG. 5. Each of the Reed-Solomon code words is decoded with an erasure polynomial $J_K(x)$ associated with a particular jamming pattern.

The voting technique may be more clearly seen in FIG. 6 in which a voter 130 may be provided with a bank of correlators 132, one for each of the hypothesized jamming patterns. Each correlator 132 is provided with an erasure polynomial to produce a metric representing the likelihood that a particular jamming pattern is the correct pattern. The largest metric determines the estimated jamming pattern that is used for demodulation.

As may be determined by further analysis of the above-mentioned technique, a potential ambiguity in the selected hypothesis may exist. Depending upon the random errors induced by the channel conditions on the unjammed hops it may be possible to demodulate with a hypothesized jamming pattern that is not correct but that covers the actual jamming pattern. It will be noted, however, that as channel conditions worsen, the likelihood of a potential ambiguity is reduced.

Figure 7:
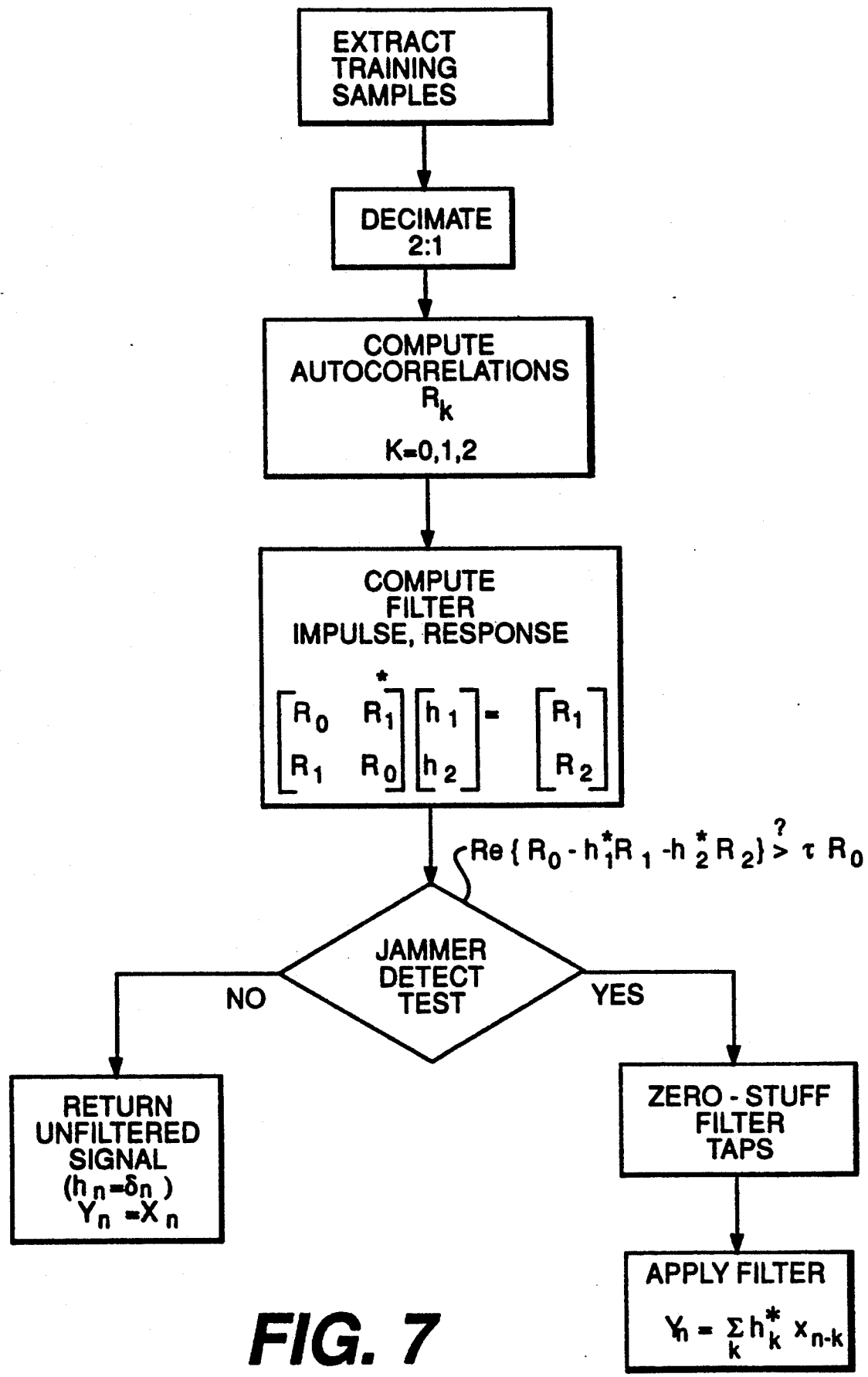
FIG. 7 is a block diagram of the method for determining whether excisable jamming is present.

In addition to the foregoing technique for identifying nonexcisable jamming, the present invention may include adaptive filters for excisable jamming. With reference to FIGS. 7 and 8, the excisable jamming technique of the present invention may include a filter that is adapted to operate in a period of a single hop, wherein each hop is to be transmitted at a frequency that is different from an adjacent hop. The received signal may be sampled at the frequencies on which a narrowband jammer is present.

Using the algorithms set forth in FIG. 7 the presence of jammers at the particular frequencies may be determined so that the excision method of the present invention may be used only when jamming is present to avoid unnecessary distortion of the signal. As seen in FIG. 7, the ratio of the energy of the filtered signal to the energy of the unfiltered signal is determined. A small ratio is indicative of the presence of jamming.

Figure 8A:
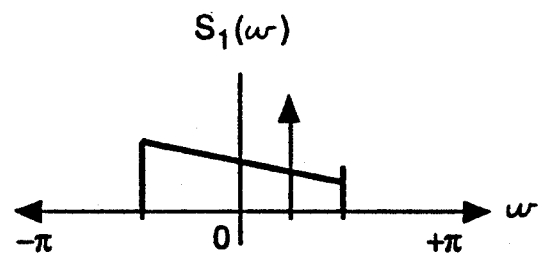
FIGS. 8A–8E are spectral representations depicting the excision process of the present invention.
Figure 8B:
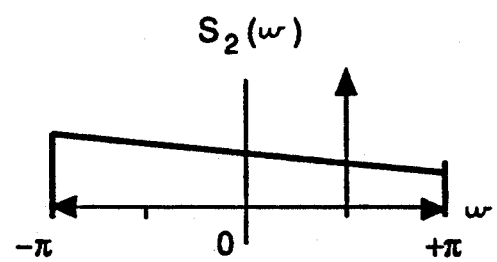
Figure 8C:
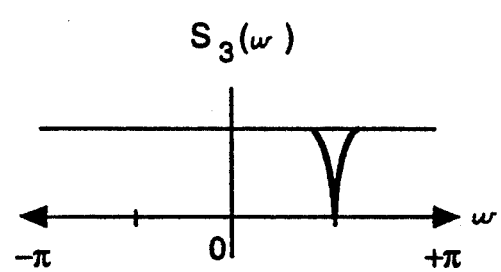
Figure 8D:
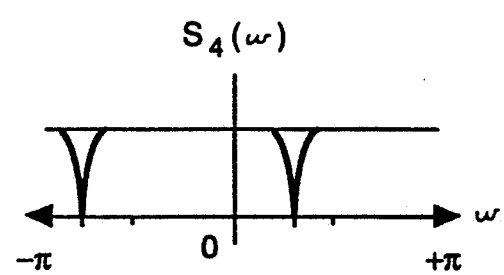
Figure 8E:
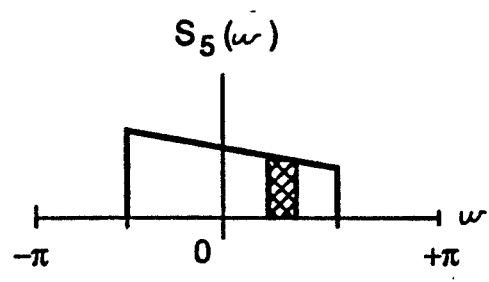

When excisable jamming is present, an excision process as illustrated in FIGS. 8A–E may be used. For example, in FIG. 8A, the presence of narrowband jamming at a particular frequency is indicated by the outwardly pointing arrow. The received signal may be decimated as seen in FIG. 8B and the spectrum of the impulse response of the resulting excision filter determined as seen in FIG. 8C. FIG. 8D exemplifies the spectrum of the 0-stuffed impulse response of the excision filter. The resulting spectrum of the filtered signal may be seen in FIG. 8E. The cross hatch region may be lost to the jammer but such loss may be better than allowing sidelobes from the jammer to spread.

While preferred embodiments of the present invention have been described, it is to be understood that the embodiments described are illustrative only and that the scope of the invention is to be defined solely by the impended claims when accorded a full range of equivalence, many variations and modifications naturally occurring to those skilled in the art.

I claim:

1. A method of identifying jamming in voice radio communications, comprising the steps of:
   a. transforming voice signals into digital data;
   b. encoding the digital data with periodic parity checks and by using Reed-Solomon techniques;
   c. transmitting the encoded digital data;
   d. comparing a received signal to plural predetermined jamming patterns by decoding the received signal for each of said predetermined jamming patterns; and
   e. evaluating the compared plural jamming patterns to identify which one of the jamming patterns is most likely present.

2. The method as defined in claim 1 wherein step a. further comprises the step of transforming the voice signal into hops of digital data and wherein said transmitter is adapted to transmit each of said hops of digital data on a frequency that may be different from a frequency on which an adjacent one of said hops is transmitted.

3. The method as defined in claim 1 wherein the presence of excisable jamming may be indicated by the method comprising the steps of:
   i. providing a filter for the received signal; and
   ii. determining when excisable jamming is present by comparing (a) the energy level for the received signal, when said filter is applied, to (b) the energy level for the received signal when said filter is not applied.

4. A improved method of antijamming voice radio communications, comprising the steps of:
   a. transforming voice signals into digital data;
   b. encoding the digital data;
   c. transmitting the encoded digital data;
   d. receiving a signal containing the encoded digital data;
   e. providing a filter for excisable jamming;
   f. determining when excisable jamming is present by comparing (i) the energy level for the received signal when said filter is applied to (ii) the energy level for the received signal when said filter is not applied;
   g. applying said filter when excisable jamming is present;
   h. comparing the received signal to plural predetermined jamming patterns by decoding the received signal for each of said predetermined jamming patterns; and
   i. evaluating the compared plural jamming patterns to identify which one of the jamming patterns is most likely present; and
   j. demodulating the received signal responsive to the identified one of the jamming patterns.

5. A method of communicating a message comprising plural bits of digital information with reduced susceptibility to successful jamming, comprising the steps of:
   a. grouping said plural bits of information into a second plurality of sub-groups of said plural bits;
   b. transmitting plural copies of the second plurality of sub-groups in a predetermined order along with synchronization, learning and error detection and correction signals, said transmitting including transmitting a portion of the second plurality of sub-groups on different carrier frequencies to provide time and frequency dispersion to the plural bits of digital information;
   c. receiving said transmitted copies at a location other than the location of the transmitter;
   d. selecting a test matrix of jamming patterns, each of said jamming patterns having predetermined one or more of the sub-groups as having been received correctly and the others of the sub-groups as having been received incorrectly; and
   e. decoding said received copies using each of the jamming patterns and the error detection and correction signals to determine which of the jamming patterns procedures decoded copies with the lowest error rates.

6. A system for communicating voice radio signals comprising;
   a. means for transforming voice signals into digital data;
   b. means for encoding said digital data with periodic parity checks and by using Reed-Solomon techniques;
   c. means for transmitting said encoded data;
   d. means for comparing a received encoded data signal to plural predetermined jamming patterns by decoding the received signal for each of said predetermined jamming patterns; and,
   e. means for evaluating the compared plural jamming patterns to identify which one of the jamming patterns is most likely present.

7. The system of claim 6 wherein said transforming mans further comprises means for transforming the voice signal into hops of digital data and wherein the transmitting means transmits each of said hops of digital data on a frequency that may be different from a frequency on which an adjacent one of said hops is transmitted.

8. The system of claim 7 further comprising;
   (i) means for filtering the received signal; and
   (ii) means for determining when excisable jamming is present by comparing (a) the energy level for the received signal, when said filtering means is applied, to (b) the energy level for the received signal when said filtering means is not applied.

* * * * *